No. 894,876. PATENTED AUG. 4, 1908.
C. CLARK.
BALING PRESS.
APPLICATION FILED AUG. 22, 1907.
13 SHEETS—SHEET 1.
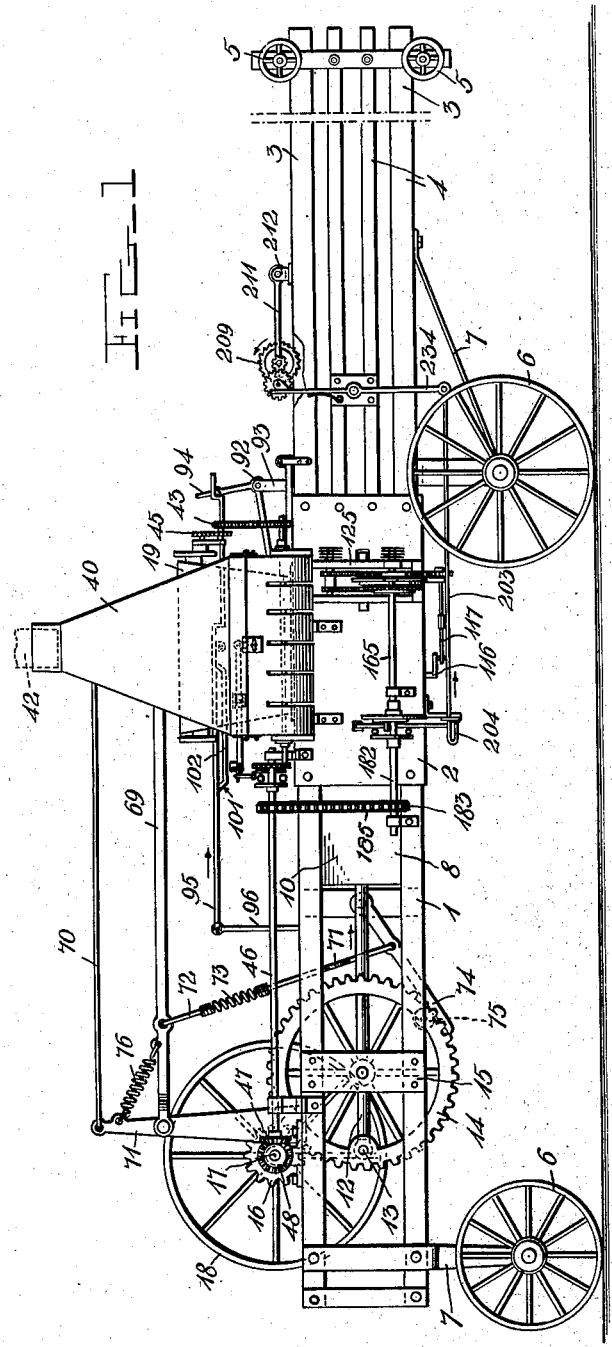
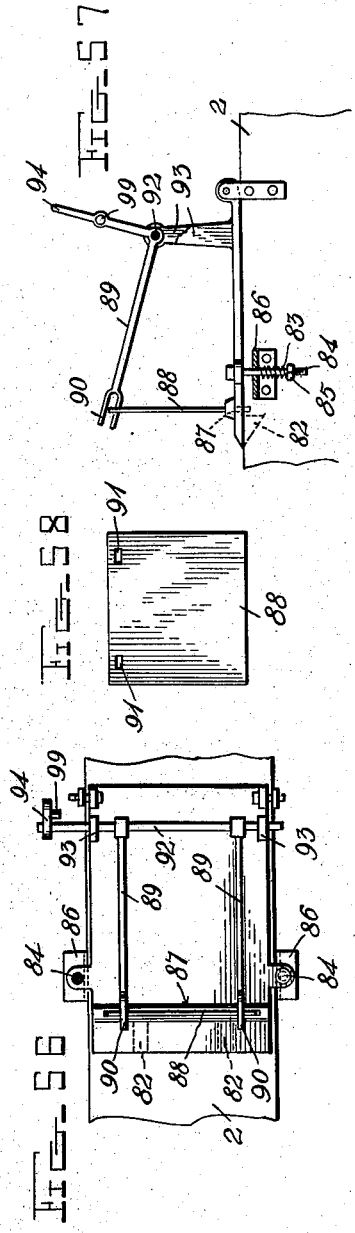
Witnesses
Inventor
Charles Clark
by Attorneys

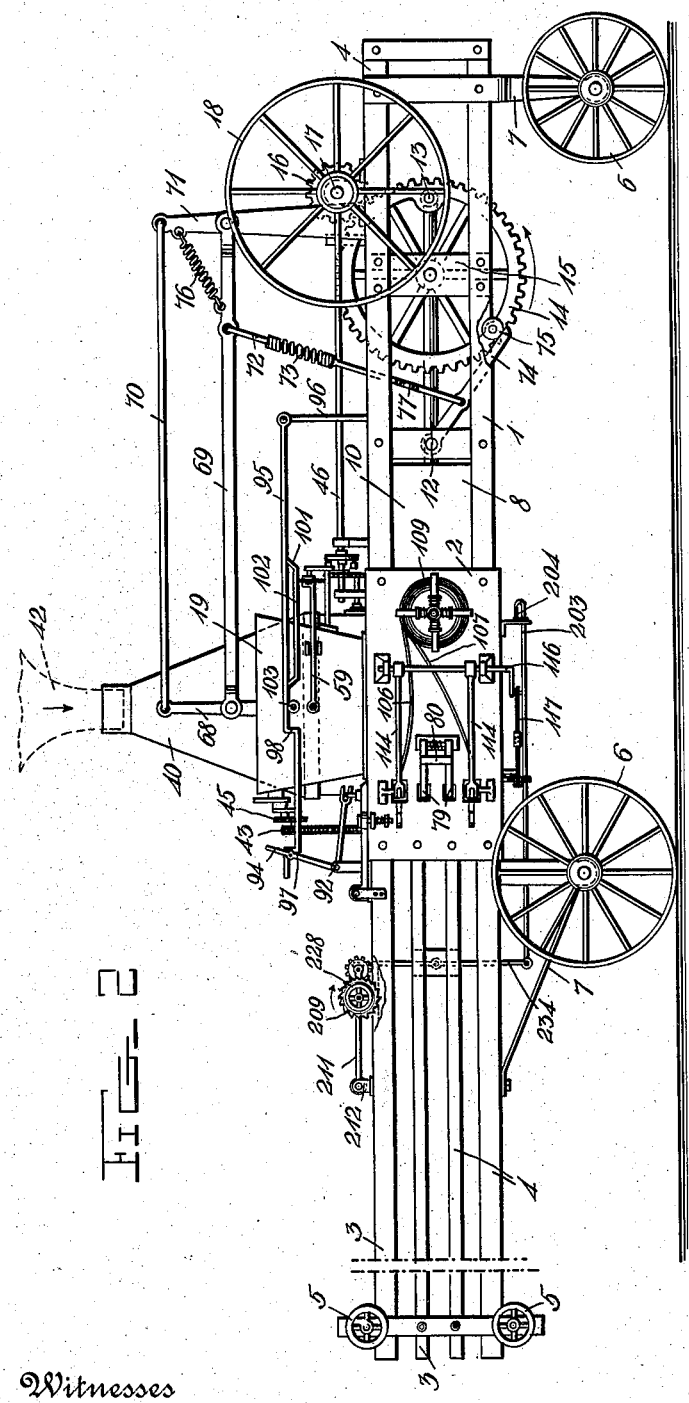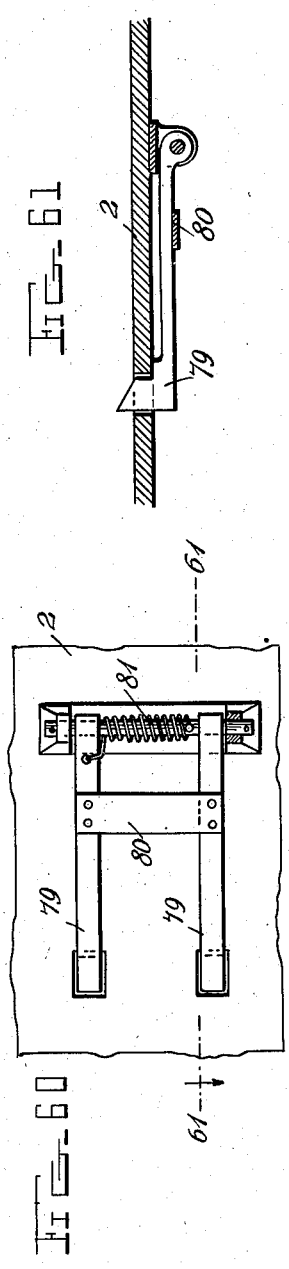

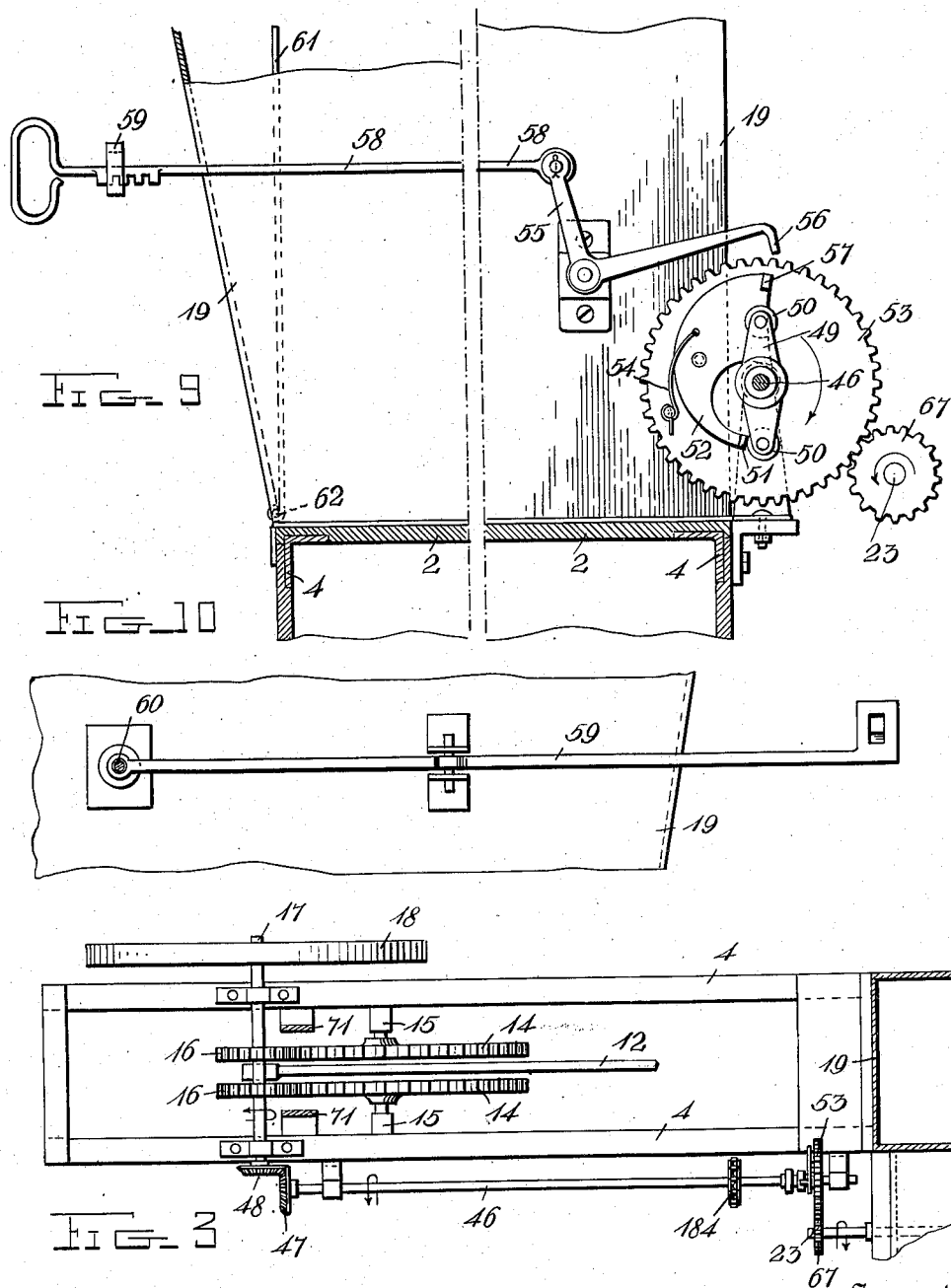

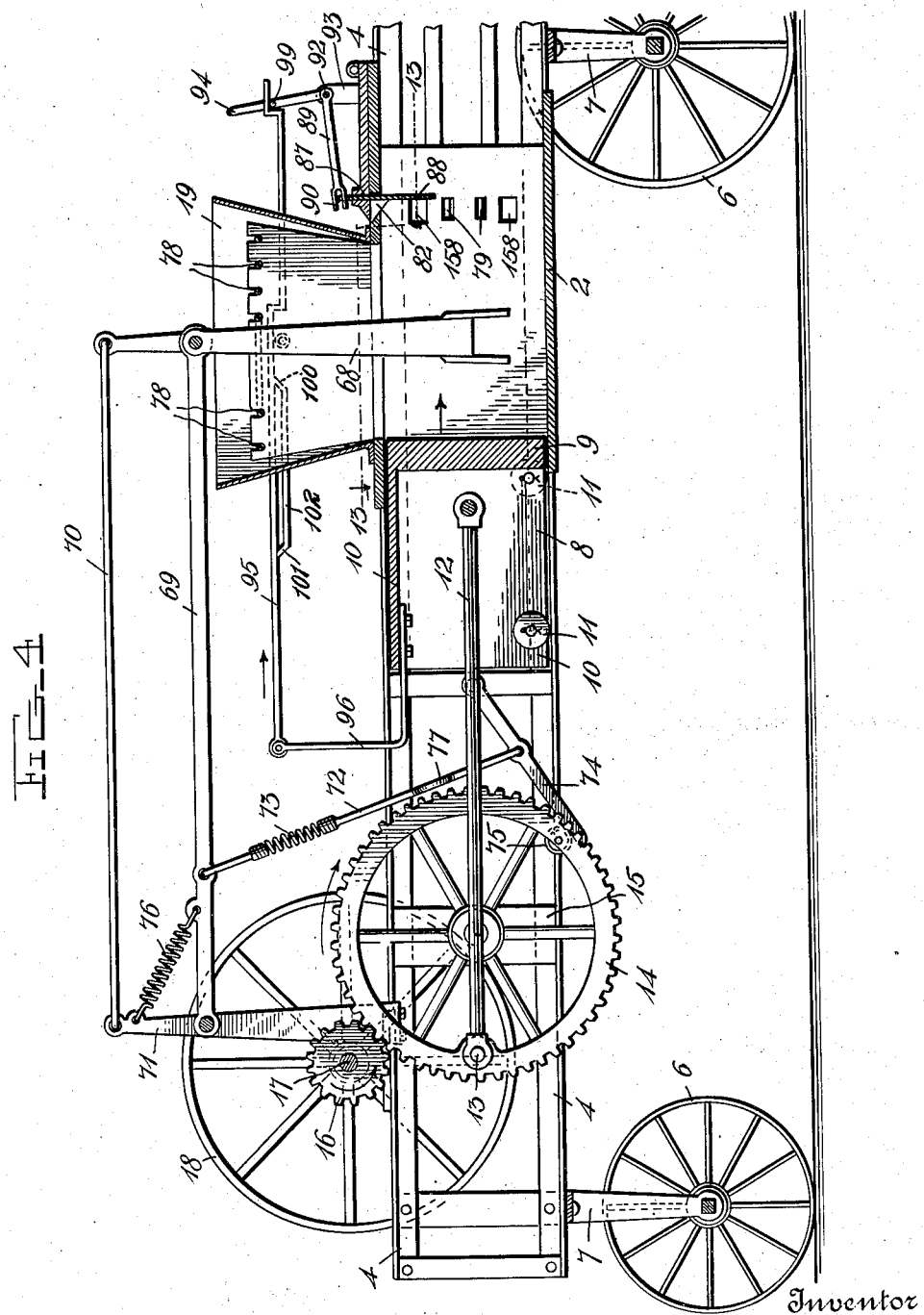

No. 894,876.
PATENTED AUG. 4, 1908.
C. CLARK.
BALING PRESS.
APPLICATION FILED AUG. 22, 1907.
13 SHEETS—SHEET 5.
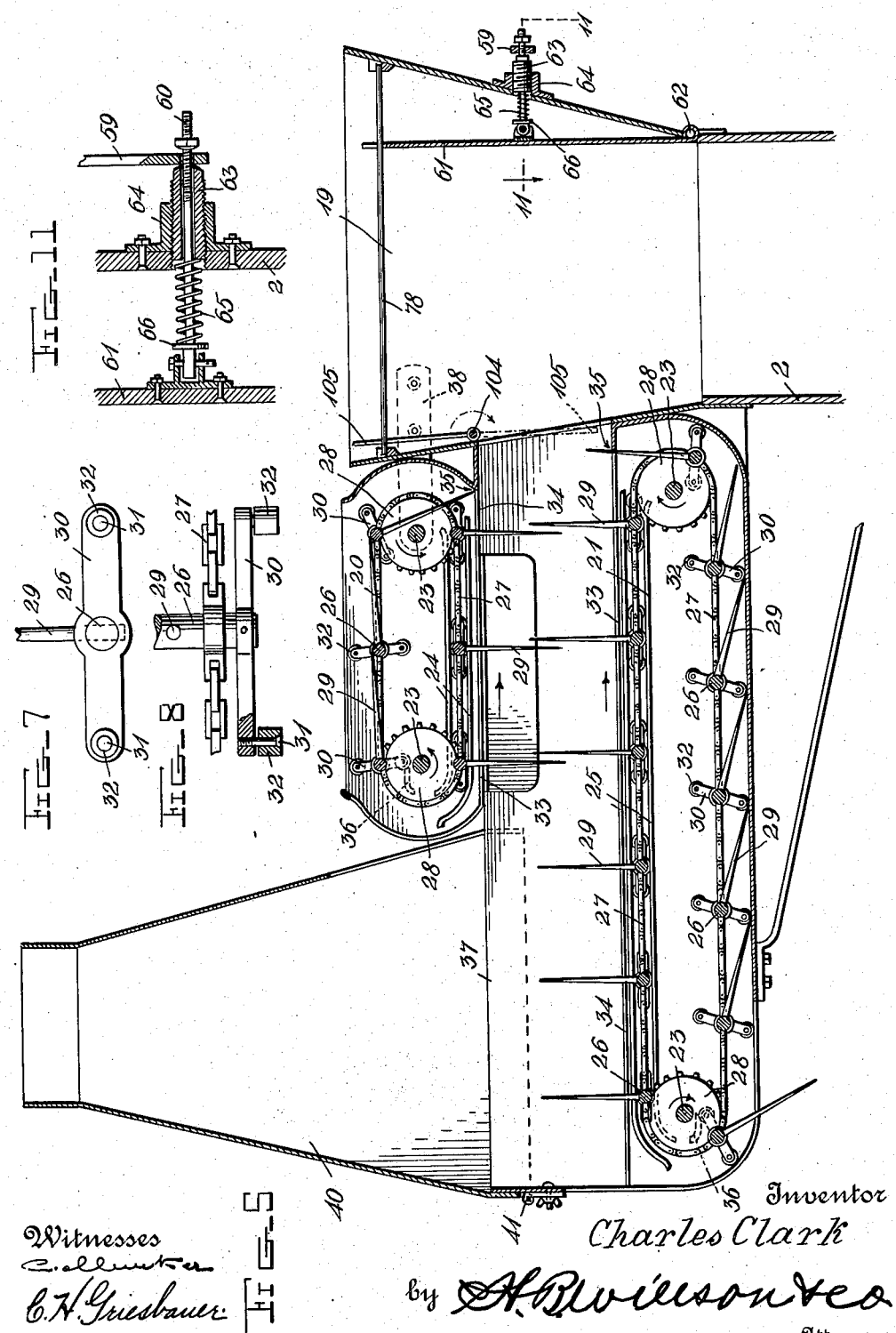
Witnesses
Inventor
Charles Clark
by H. B. Willson & Co.
Attorneys

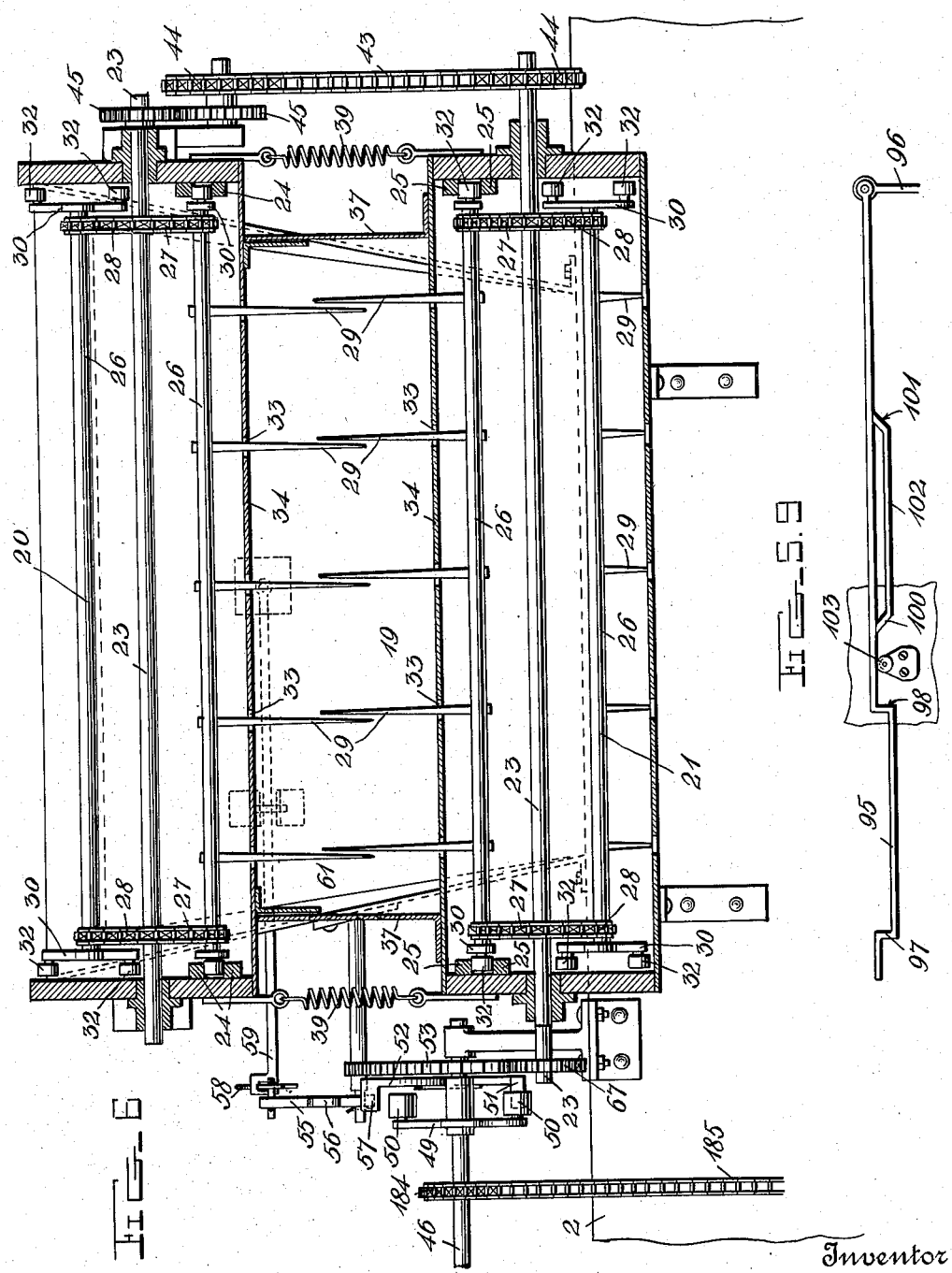

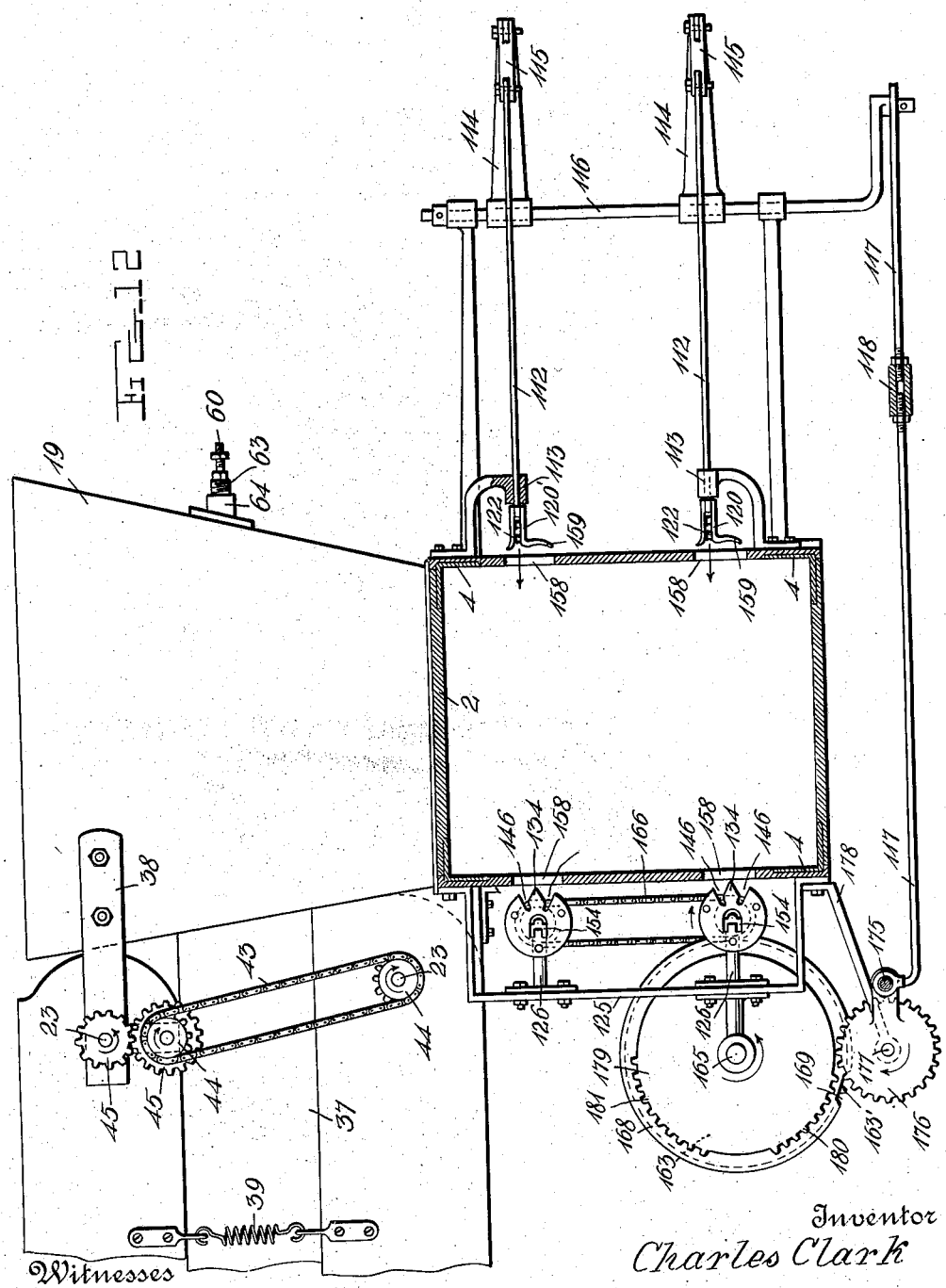

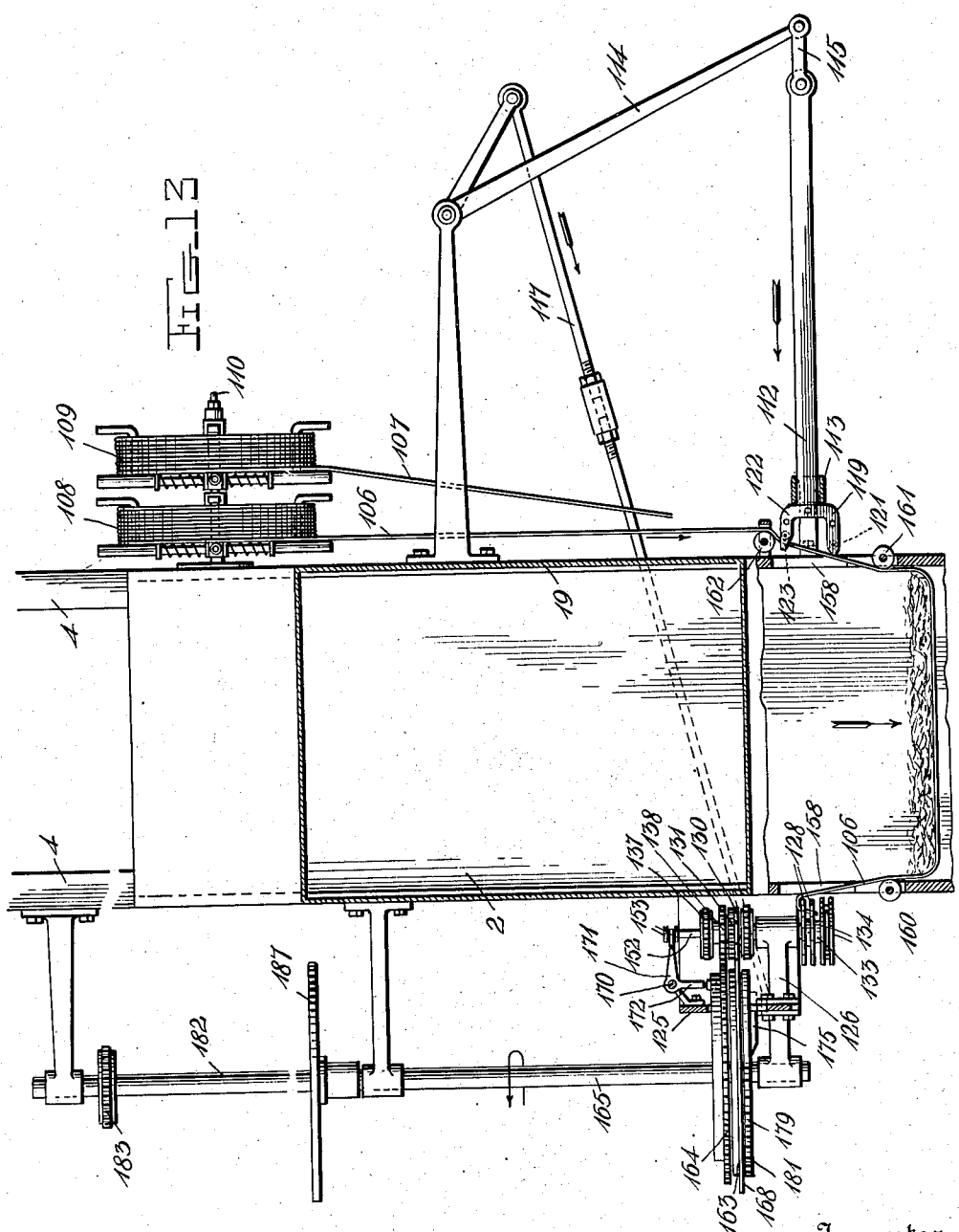

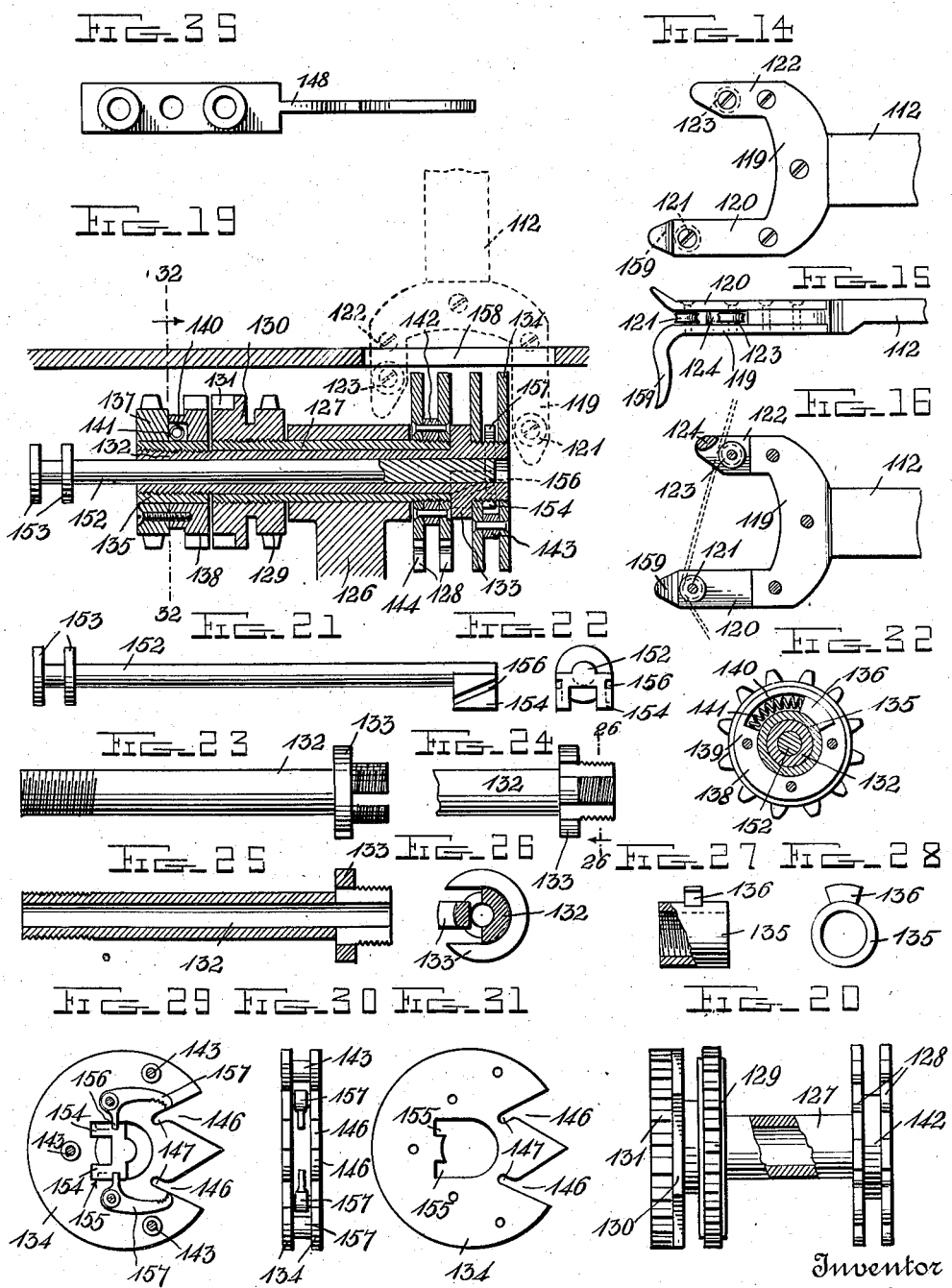

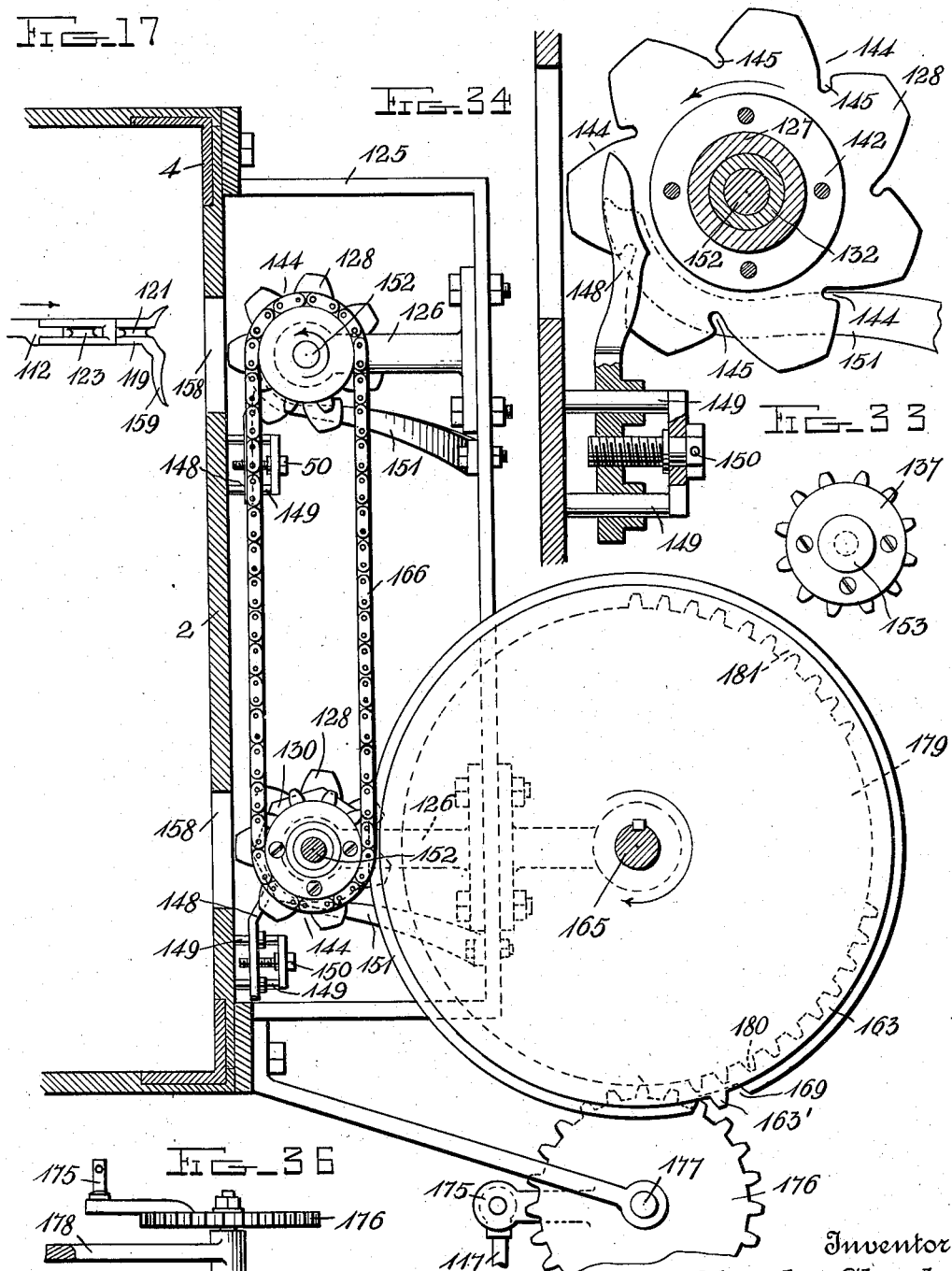

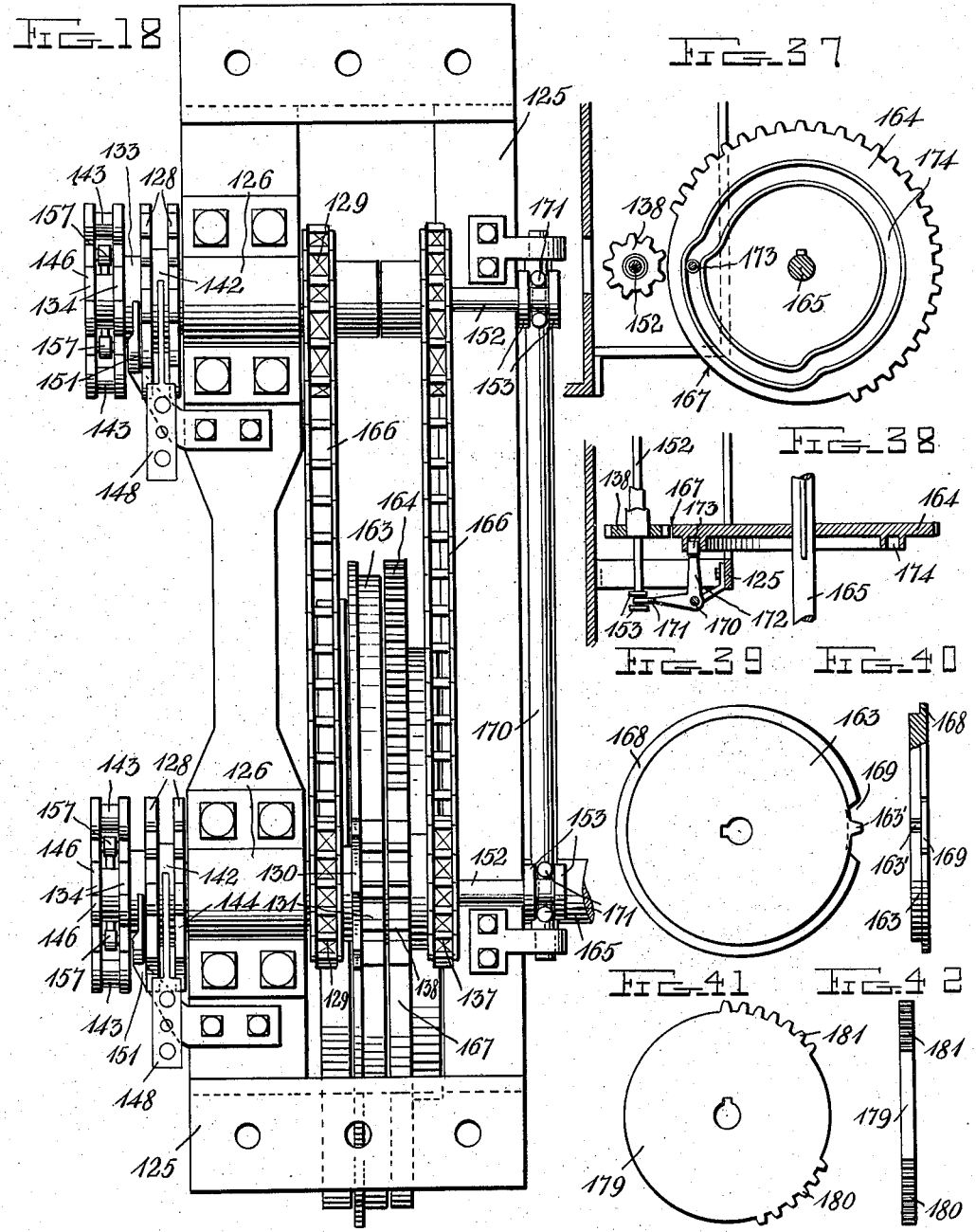

No. 894,876.
PATENTED AUG. 4, 1908.
C. CLARK.
BALING PRESS.
APPLICATION FILED AUG. 22, 1907.
13 SHEETS—SHEET 12.
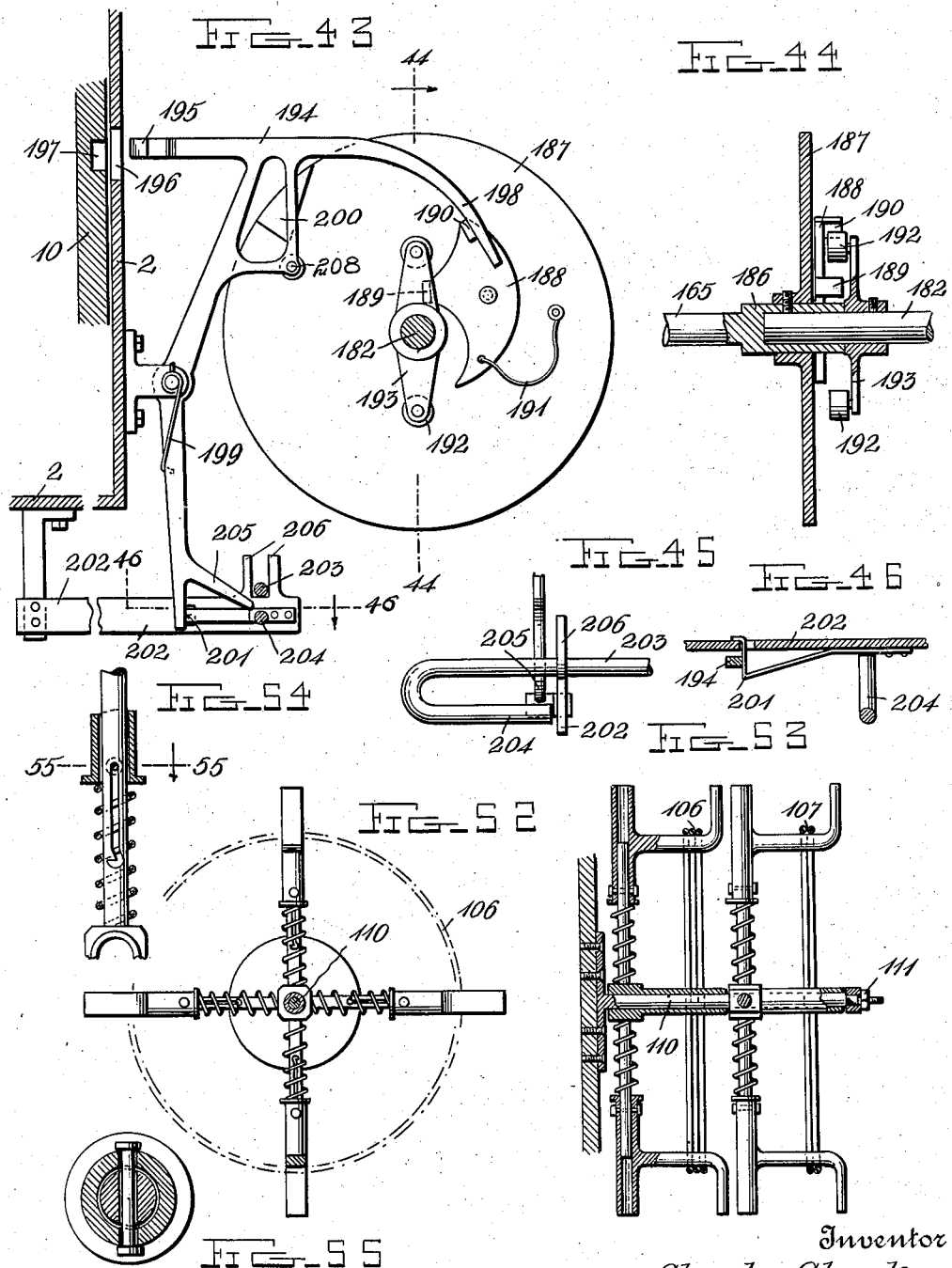
Witnesses
C. H. Griesbauer
Inventor
Charles Clark
by H. B. Willson & Co
Attorneys

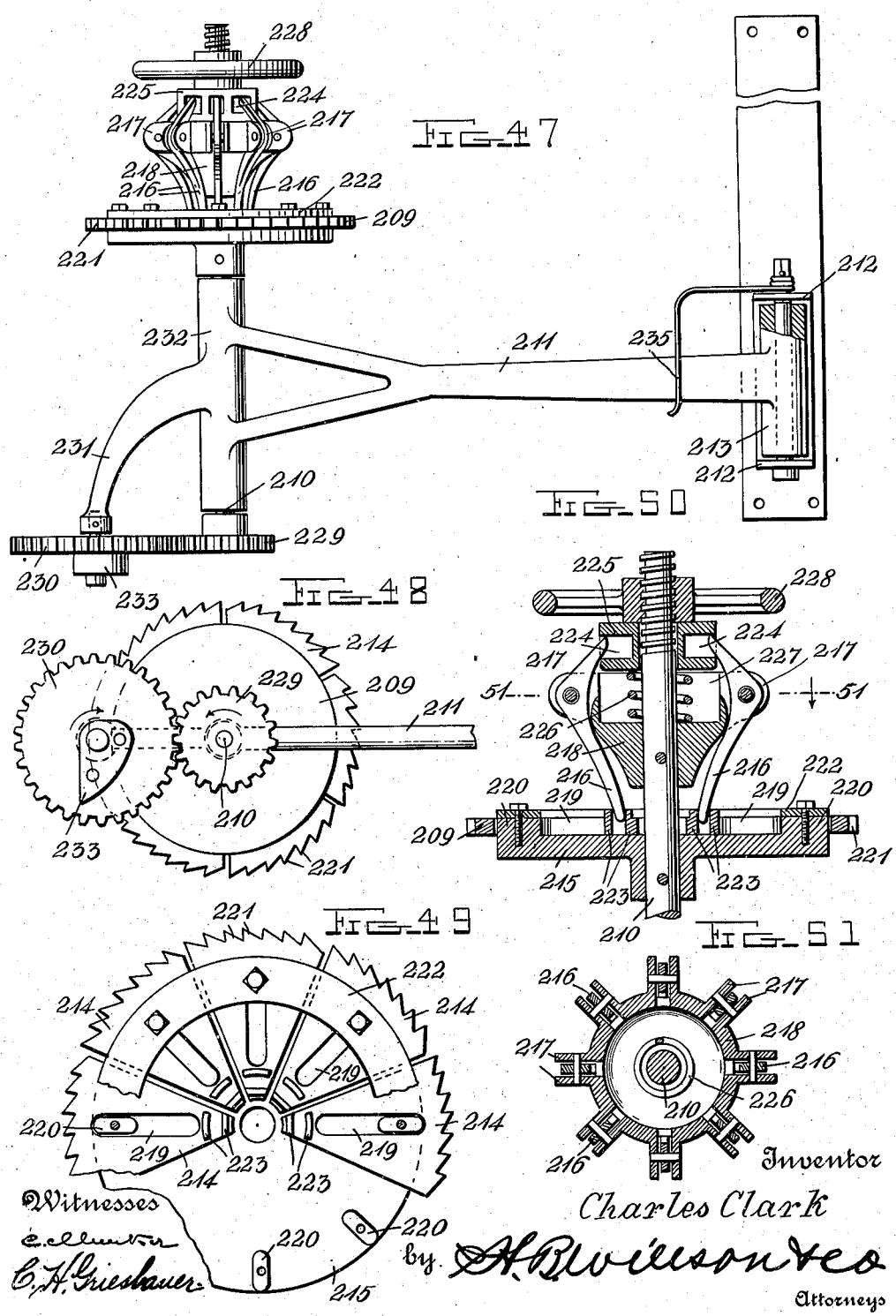

UNITED STATES PATENT OFFICE.

CHARLES CLARK, OF GUEYDAN, LOUISIANA.

BALING-PRESS.

No. 894,876.       Specification of Letters Patent.       Patented Aug. 4, 1908.

Application filed August 22, 1907. Serial No. 389,716.

*To all whom it may concern:*

Be it known that I, CHARLES CLARK, a citizen of the United States, residing at Gueydan, in the parish of Vermilion and State of Louisiana, have invented certain new and useful Improvements in Baling-Presses; and I do declare the following to be a full, clear, and exact description of the invention, such as will enable others skilled in the art to which it appertains to make and use the same.

This invention relates to baling presses and has for its object to provide a press which will be automatic in all of its operations and self-contained, that is, which will take the material as from a threshing machine, or from hand feeding, and will feed and form it into bales, tie the bales and discharge them at the rear end. In this manner, the operation of the press becomes substantially continuous from the time the material is fed in at one end until its discharge in complete bales at the other.

In the accompanying drawings which illustrate the invention,—Figure 1 is a side elevation of a press embodying my invention; Fig. 2 is a similar view from the other side; Fig. 3 is a top plan view of the forward end of the press; Fig. 4 is a longitudinal sectional view; Fig. 5 is a vertical sectional view through the hopper and the feeding mechanism; Fig. 6 is a transverse vertical sectional view through the feeding mechanism; Figs. 7 and 8 are broken detail views of parts of the feeding mechanism; Fig. 9 is a broken side elevation of the hopper and feeder controlling mechanism; Fig. 10 is a detail view of a lever forming part of the controlling mechanism; Fig. 11 is an enlarged detail view of a portion of Fig. 5; Fig. 12 is a transverse sectional view of the press at the end of the baling chamber; Fig. 13 is a longitudinal sectional view taken on the line 13—13 of Fig. 4, looking down, showing the wire being carried forward in front of the bale. Figs. 14, 15 and 16 are detail views of the forward end of one of the needles; Fig. 17 is an end elevation of the tying mechanism; Fig. 18 is a side elevation of the same; Fig. 19 is a longitudinal sectional view of one of the tyers; Fig. 20 is a broken side elevation of one of the cutter heads; Figs. 21, 22, 23, 24, 25, 26, 27, 28, 29, 30, 31, 32 and 33, are detail views of the different parts of one of the tyers; Fig. 34 is an enlarged sectional view of the holding mechanism; Fig. 35 is a plan view of the holding bar; Fig. 36 is a detail view of the needle actuating mechanism; Fig. 37 is a side elevation of the gripper controlling mechanism; Fig. 38 is a sectional view of the same; Figs. 39, 40, and 41, 42, are elevation and side views, respectively, of parts of the tying mechanism; Fig. 43 is a side elevation, partly in section, of the clutch for controlling the tying mechanism; Fig. 44 is a sectional view of the same and taken on line 44—44 of Fig. 43; Fig. 45 is a detail view of part of the mechanism shown in Fig. 43; Fig. 46 is a section view on line 46—46 of Fig. 43; Fig. 47 is a top plan view of the means for engaging with a bale and actuating the clutch to control the tying mechanism; Figs. 48, 49, and 50, 51, are elevation and sectional views, respectively, of the same; Figs 52, 53, 54 and 55, are detail views of the wire holding mechanism; and Fig. 55 is a section on line 55—55 of Fig. 54. Fig. 56, 57 and 58 are detail views of the hay retaining means; Fig. 59 is a detail view of the mechanism for actuating the folder plate; and Figs. 60 and 61 are elevation and sectional views, respectively, of part of the hay retaining mechanism.

Referring more particularly to the drawings, 1 indicates the main frame or longitudinal chamber, through which the material is passed in being formed into the bales and tied. This frame may be of any desired length and area in cross section and be formed in any suitable manner, the forward or feeding chamber 2 being preferably formed with solid sides and bottom and open at the top, while the rear portion or discharge end 3 is preferably formed by longitudinally-arranged slats 4, the corner slats being preferably formed from angle iron. The rear end of the slatted portion is preferably provided with suitable pressure-regulating mechanism actuated by the wheels 5. The entire press is preferably mounted upon suitable wheels 6 and frame 7, whereby it may be readily transported from place to place.

Reciprocally mounted in the feeding chamber 2 is a plunger 8, which can be of any desired construction, but I prefer to construct it with a solid head 9 and rearwardly-extending walls 10, which closely fits within the feeding chamber and is adapted to press the material forward out into the baling chamber at the rear. The plunger is preferably mounted upon wheels 11, which roll back and forth upon the bottom of the chamber or the forward portion of the frame in the usual manner to reduce friction.

The plunger is reciprocated by means of a pitman 12, which is secured to the head 9 in any suitable manner, and at its other end it is suitably secured to a wrist pin 13 that extends between two gear wheels 14. The gear wheels 14 are mounted upon cross pieces 15 of the main frame in any suitable manner, and each of them is engaged by a pinion 16 upon a shaft 17 that is mounted on top of the main frame and driven in any suitable manner, as by means of a drive wheel 18, said drive wheel receiving power from any suitable source, (not shown).

The material is fed into a hopper 19 above the feeding chamber 2, by means of endless feeders 20 and 21. These feeders are mounted upon shafts 23, and each comprises a series of rods or shafts 26, that are journaled at their ends in suitable chains 27, that engage with sprocket wheels 28 on the rods 23. Each rod 26 is provided with a plurality of fingers 29, that are adapted to be held at right angles to the length of the track-way when moving in their operative position, by means of cross-heads 30. Each cross-head 30 is secured to one of the rods 26 and has its ends provided with laterally-extending projections 31, which engage with the track-ways and cause the rod to hold its fingers projected or retracted as the case may be. The projections are preferably provided with anti-friction rollers 32 which travel in track-ways 24 and 25 and assist in preventing friction. To cause the fingers to stand projected when moving in their operative position, the cross-heads 30 are caused to travel between two tracks, which will cause the heads to stand in line with the length of the chain, as for instance, the upper chain of the lower feeder and the lower length or chain of the upper feeder, but when they are to be held in their retracted position, only one of the projections 31 is in engagement with the track-way, which causes the rods 26 to be rotated so as to retract or fold their fingers substantially lengthwise of the chain.

The fingers are preferably caused to project through slots 33 in the top and bottom walls 34 of the conveyer through which the material is passed into the hopper. The slots extend nearly to the forward ends of said walls and form shoulders 35, against which the fingers strike as the chains move forward and are thereby caused to be drawn down substantially lengthwise when starting on their return journey instead of being thrown out into the hopper in making the turn around the sprocket wheels 28. At the other ends of the race-ways shoulders or projections 36 are arranged for engaging with the inner ends of the cross-heads and causing them to be turned so as to throw the fingers outward into their operative position. The fingers of the two feeders are arranged to substantially overlap each other as they pass through the conveyer space or chamber formed by the walls 34 and vertical side walls 37, whereby they will engage with any material that may be between the feeders and carry it forward into the hopper. The race-ways are preferably pivotally secured to the side of the hopper by means of brackets 38, which will permit of their free ends being moved vertically to accommodate the position they are to occupy when receiving material. The lower race-way is longer than the upper one and extends a sufficient distance beyond its free end as to receive the material from whatever source of supply is being used, and the upper race-way is preferably connected with the lower race-way at its free end by means of springs 39, which will permit of sufficient movement to accommodate the passage of large bunches of material that may happen to be deposited between the feeders.

In the drawings, a hood 40 is shown as being connected with the rear end of the side walls 37, as by means of strap and button connections 41, and has its upper end adapted to receive material as from the end of a wind blower, shown in dotted lines at 42.

The two endless feeders are driven in unison by means of a sprocket chain 43 and sprocket wheels 44, the upper wheel 44 being connected with its shaft 23 by means of gear wheels 45 to cause the lower portions of the feeder to have the same forward movement as the upper portion of the lower feeder. Motion is transmitted to the lower feeder by means of a shaft 46, which is journaled at one side of the main frame and is connected with the shaft 23 of the lower feeder by means of a clutch mechanism, and has its forward end provided with a bevel wheel 47, which meshes with a bevel wheel 48 on the main shaft 17 of the driving mechanism. The clutch comprises a cross-head 49 on the shaft 46 and has each end provided with a lateral projection 50, which is adapted to engage with a projection 51 on a plate 52, which is eccentrically pivoted to the side of a gear wheel 53 when the feeding mechanism is not in gear, and to be disengaged therefrom when out of gear. The plate 52 is normally held in its operative position, that is in position for the projection 51 to be engaged by one or the other of the projections 50, by means of the springs 54. It is adapted to be thrown into its inoperative position, or with its projection 51 out of the path of the projections 50, by means of an elbow lever 55, which has the free end of one of its arms provided with a toe or projection 56, that is adapted to be moved into and out of engagement with the projection 57 on the plate 52.

The lever 55 is actuated by means of a rod 58, which is connected therewith at one end and has its other end connected with a lever 59 pivotally mounted upon the rear side of the hopper, or the side opposite said feeders. The lever 59 is connected with a rod 60, that extends rearwardly through the rear wall of the hopper from a plate 61, which is hinged at its lower edge to the lower side of the hopper, as shown at 62. An exteriorly screw-threaded sleeve 63 is loosely mounted upon the outer end of the rod 60 and has its inner end screw-threaded into a nut 64, secured to the outer side of the hopper. A spring 65 is seated upon the rod 60, between the inner end of the sleeve 63 and a shoulder 66 formed at the inner end of the rod, whereby the plate 61 may be held yieldingly in its desired position. The gear wheel 53 meshes with a corresponding wheel 67 upon the end of the forward shaft 23 of the lower feeder, whereby the feeders are adapted to be driven whenever the clutch mechanism is in its operative position. By arranging the parts in this manner, it will be seen that whenever the amount of material that is fed into the hopper is greater than can be taken care of by the baling mechanism, the plate 61 will be forced over toward the rear wall of the hopper, which will cause the levers 59 and 57 to release the clutch mechanism and stop the feeders until after the material in the hopper has been disposed of. By means of the sleeve 63 any desired tension may be placed on the spring 65, so as to require greater or less pressure from the material in the hopper to force back the plate 61 and thus regulate the mechanism, as may be desired in relation to the excessive feed. The material in the hopper is fed or forced down into the feeding chamber 2 by means of a foot-press 68, which is pivotally connected at its upper end with the free end of an arm or lever 69, and is caused to move by means of a rod 70, which is connected with a projection from the upper end of said foot. The opposite ends of said arms and rod are pivotally connected to a standard 71, that is secured to the frame 1, and they are adapted to be swung upon their pivots by a rod 72, so as to reciprocate the foot-press within the hopper. The rod 72 is preferably provided with a spring connection 73, which will yield in case the foot-press could not be readily forced down, and thereby prevent breakage. The lower end of the rod 72 is connected with the intermediate portion of an arm or lever 74, which is pivotally mounted to one side of the frame and has its free end in position to be engaged by a projection, as a roller 75, mounted upon one side of one of the wheels 14. A spring 76 is connected with the arm 69 and with the upper portion of the standard 71 for returning the foot-press and the arm 69 to their normal or elevated position, after the lever 74 has been disengaged by the roller 75. The rod 72 is preferably provided with a bend or shoulder 77, which is adapted to be engaged by the pitman 12, which will thereby assist in starting to withdraw the foot-press in case it should stick and be caught, and the spring 76 was not strong enough to lift the foot-press unaided. If desired, rods 78 may be arranged across the top of the hopper to prevent the material being carried out, as by the return movement of the foot-press.

As above-described, it will be seen that the material is fed into the hopper in substantially a continuous stream, and intermittently forced down into the feeding chamber in front of the plunger, by the reciprocation of the presser-foot. As soon as the presser foot is withdrawn, which action is very rapid owing to the peculiar arrangement for operating it, the plunger starts forward and forces the contents of the feeding chamber into the forward end of the baling chamber of the press. Any material that is fed into the hopper during the forward movement of the plunger falls upon the top of the plunger, which closes the bottom of the hopper and remains there until the plunger is withdrawn, when it falls or is forced down into the feeding chamber by the thrust of the foot-press. In this manner, the bale is gradually formed by the reciprocations of the plunger and is given the desired pressure by means of the baling wires, which have been placed in front of the bale automatically, after the first bale has been formed, the placing of the wires for the first bale being performed manually. As each feed or bundle of material is thus carried forward by means of the plunger, it is forced past dogs or catches 79, which are pivotally secured to the sides of the feeding chamber and have their free ends bent at an angle so as to project through openings in the sides of said chamber in position for engaging with said material and preventing its return after it has been forced into position by the plunger. In the drawings, two such dogs are shown upon each side, which are connected by a cross-piece 80 and are held in their inner or operative position by means of a spring 81 upon their pivots. In addition to the dogs 79, a hook 82 is pivotally secured at one end to the top of the frame, and has its free end located in position for passing down in front of the top of the feed or bunch of material, and thereby assist in holding it in position when the plunger returns for another feed. The forward end of the hook is inclined so as to be lifted automatically by the passage of the material under it, and it is normally held down by means of a spring 83 which encircles a pin or bolt 84 and engages at one end with a shoulder 85 on the end of the pin 84, and at the other end with a plate 86, through which the bolt passes.

The hook 82 is provided with a vertical slot 87, through which a plate or folder is adapted to be reciprocated by means of two arms 89. The forward ends of the arms 89 are forked, as shown at 90, and the lower arm of each fork projects through a hole 91, near the upper edge of the plate 88, whereby the plate is positively driven in both directions by the movements of the arms. The rear ends of the arms 89 are connected with a rock-shaft 92, which is journaled in bearings 93 on the frame and an arm 94 projects upwardly from said shaft in position for being actuated by a reciprocating bar 95. The forward end of the bar 95 is pivotally connected with a standard 96, which is connected with the rear end of the plunger, and has its forward end provided with two shoulders 97 and 98. Each of said shoulders is adapted to engage with the projection 99 upon one side of the arm 94, and thereby rock the arm so as to move the plate or folder 88 vertically whenever the bar 95 is reciprocated, one of said shoulders being adapted to move the rock-shaft in one direction and the other one to move it in the opposite direction. The intermediate portion of the bar 95 is provided with two shoulders 100 and 101, as by means of a bar or rod 102, which is connected at its ends with the bar 95, and thereby forms the two inclined shoulders 100 and 101. The intermediate portion of the bar 102 is adapted to be supported upon a shoulder or projection 103 upon one side of the hopper, preferably above the lever 59 and rod 60. The shoulders 100 and 101 are so arranged relatively to the projection 103 that they will not engage with said projections until after the folder 88 has been moved to its limit in one direction or the other, but as soon as it has reached such limit, the engagement of said shoulders with the projection will cause the bar 95 to be lifted and the shoulders 97 and 98 disengaged from the projection 97, which will thereby leave the folder in one position or the other, while the plunger is making the greater portion of its travel.

Instead of permitting the material to be fed into the hopper continuously, as above described, a rake-head 104 may be provided and actuated or reciprocated in any suitable manner, so as to cause its fingers or teeth 105 to project down in front of the feeders and thereby hold back the material until it is desired to discharge the same into the hopper, as for instance, when the foot-press descends, which will thus assist in separating the material in the hopper from that which is being fed in by the feeders.

As above described, it will be seen that the material that is fed to the machine is intermittently formed into bunches and compressed to the desired extent in the baling press. The pressure is determined to a greater or less extent by the mechanism shown at the rear end of the slatted chamber 3, which permits of such chamber being contracted so as to afford the desired frictional contact upon the previously formed bales to secure the desired pressure upon the bale that is being formed. After each feed or additional bunch of material has been forced out of the feeding chamber into the baling chamber, the plate 88 will descend and force down the loose ends of any material that may be projecting outwardly, and thereby place it in condition for being engaged by the bale wire and thus cause the bale to have a neat appearance upon all sides and edges. After the bale has been formed in the above-described manner, it is tied or bound into its compressed form by means of an upper and lower binding wire 106 and 107, respectively, which are unwound from two reels 108 and 109 upon one side of the machine. These reels of wire are preferably placed upon the same spindle 110, side by side, and are rendered self-adjusting to the size of the reel as by causing one side piece of the reel to slip up and down on the other side and holding it out against the underside of the reel by a spring. When it is desired to put a new reel on, the sides are pulled down and caught, and after the reels have been placed in position, the springs are let loose. A nut 111 is provided for the outer end of the spindle 110 for adjusting the tension upon the reels so as to prevent their rotating too rapidly. The wire is placed across the main frame to the rear of a completed bale by means of two needles 112, which are similar to each other, and, therefore, only one of them will be particularly described. The needles are each preferably in the form of a substantially rectangular bar, which is slightly flexible to permit of the necessary movement of its free end in manipulating the wire, as hereinafter described. It is reciprocally mounted in a bracket 113 and connected at its outer end with an arm 114, by means of a link 115. The arms 114 are rigidly secured to a crank-shaft 116, which is journaled vertically upon the sides of the feeding chamber in position to reciprocate the needles when the shaft is rocked by means of the pitman 117, that is secured to the crank of the shaft at one end and with the tying mechanism at the other, said shaft being preferably adjustable as by means of a turn-buckle 118.

The free end of each needle is provided with a head 119, which is forked with one arm 120 preferably slightly longer than the other and provided with a grooved wheel or pulley 121, and the other arm 122 is provided with a similar wheel or pulley 123 and is also provided with a stop or cross-piece 124, between which and the pulley 123 one of the wires is adapted to be passed and have its ends secured by the twisting mechanism.

The wire-cutting and twisting mechanism comprises two substantially duplicate structures, one for each wire, mounted upon the side of the frame 1, opposite the wire and needle-actuating mechanism, as by means of a looped or bail-like bracket 125. Projecting inward from the bracket are two standards 126, within which is journaled a sleeve 127 having each end exteriorly screw-threaded and adapted to receive two disks 128 at one end, and a sprocket wheel 129 at the other. In addition to the sprocket wheel, one of the wheels is further provided with a scalloped disk 130 and a pinion 131. Mounted within the sleeve 127 is another sleeve 132, which has an annular collar 133 adjacent to one end and each end exteriorly screw-threaded. Mounted upon the shouldered end of the sleeve 132 are two twister-disks 134, and upon the other end a sleeve or collar 135, which is provided intermediate its length with a shoulder or projection 136. Loosely mounted upon the sleeve 135 is a sprocket wheel 137, and upon one of the sleeves a pinion 138 and an annular collar 139, which is recessed, as at 140, for the reception of the collar 135. The recess is of a greater length than the shoulder, and a spring 141 is adapted to be placed therein for normally holding the shoulder at one end of the recess, yet permitting its movement toward the other end of the recess, as for instance, when cutting off the wire by the forward movement of the holder disks 128, as will be hereinafter described.

The holder disks 128 are spaced apart, as also the twister disks 134, in any suitable manner, as by means of a washer 142 between the disks 128 and either sleeves or washers 143 between the disks 134. The periphery of each of the holder disks 128 is provided with V-shaped notches 144, which terminate in wire holders or pockets 145 at the bottom. The twister disks are each provided with V-shaped notches 146, each terminating at its bottom with a wire holder or pocket 147. The notches of the disk of each pair and also of the pairs relatively to each other are set slightly in advance of each other, so that the wire in passing through all of the pockets will stand in an inclined position in going from the wheel 123 to the wheel 121 in the arms of the needle head 119.

Adjustably secured to the side of the main frame is a holding bar 148, which is preferably loosely mounted upon two pins or studs 149 and adapted to be moved back and forth thereon by means of a shouldered adjusting screw 150. The free end of said bar is adapted to extend up between the holding disks 128 in position for engaging the wire and forcing it in between the sides of the bar and said disks when the disks are rotated for cutting off the wire. Secured to the bracket is a cutter bar 151, which has its free end sharpened and placed adjacent to the edge of the outer holding disk, so as to engage the wire and cut it off whenever said disks are rotated.

Reciprocally mounted within the sleeve 132 is a rod or bar 152, which is provided at its outer end with means for being engaged by an actuator, as collars 153. The inner end or head of said bar is provided with two wings or projections 154, each of which is adapted to fit in a corresponding recess 155 in the twister heads and is provided with an inclined groove or channel 156. Pivotally mounted between the twister disks are two substantially L-shaped grippers 157, which have their outer ends arranged in position for engaging with the wires in the pockets 147, and holding them there during the process of twisting the ends of the baling wires together. Said ends are preferably notched or corrugated for engaging with the wires and the other ends of said grippers are seated in the grooves 156, whereby the grippers are caused to swing upon their pivots when the rod 152 is reciprocated.

The twister and holding disks, as above described, are located adjacent to the opening 158 in the side of the frame 1, through which the head of the wire needle is adapted to be projected with one of its arms at the rear of the holding disks and the other arm in front of the twister disks and the wire between them in position for being forced into said pocket where they are subsequently held by the grippers and holding bar. After a bale has been tied in this manner, the needle is withdrawn, which will leave the ends of the wire in engagement with the respective holding disks and in position for engaging with and being engaged by the bunch or feed of the new bale that is pressed forward by the plunger. As the bale is formed by the successive reciprocations of the plunger, the wire is gradually unwound from the spools and forced back with the forward end of the bale until the bale is completed, when the needle is again thrust forward and the new bale is bound in the same manner as before. In this movement of the wire, the end that was held by the holding disks is carried down one step by the rotation of said disks and the arm 120 of the head 119 is provided with a downwardly-extending projection or finger 159, which is adapted to engage with the wire and force it into the lower notch 146 of the twister head in position for being engaged by the gripper when the twisters are actuated. The wire upon that side of the frame preferably passes under a roller 160 and upon the other side of the frame it passes under a roller 161, which will prevent undue friction. Upon the last-mentioned side of the frame the wire from the reel also passes over another roller 162 to prevent undue friction as the needle moves forward to carry the wire across the baling chamber.

The disks, as above described, are actuated by means of two gear wheels 163 and 164, secured to shaft 165, which is suitably mounted lengthwise upon the side of the frame 1. The corresponding sprocket wheels of the two sets of mechanism, as above described, are connected by sprocket chains 166, so as to cause them to rotate in unison and one of the wheels, as 163, is provided with only one tooth 163' so as to only turn the holding disks one step forward each time that the wheel 163 is given a complete revolution. The other wheel 164 is provided with a sufficient number of teeth to give the desired number of rotations to the twister disks, preferably three for each complete revolution of said wheel. As it is necessary to hold said disks stationary during a portion of the operation of tying the bale to permit of the reciprocation of the needle, a portion of the wheel 164 is left blank or untoothed as shown at 167. In order to hold said disks against accidental rotation, a disk 168 is provided which is adapted to engage with the scallops or recesses of the disk 130, except at the instant that the tooth 163' is engaging with one of the pinions 131, at which time a recess or cut-away portion 169 of the disk 168 stands opposite the scalloped disk and permits the latter to move forward one step, after which it is immediately reëngaged by the disk 168 and held against rotation, as hereinbefore described. There are as many scallops or recesses in the disk 130 as there are V-shaped notches in the holder disks 128, seven being shown in the drawings, which will cause the notches of the holder disks to be always moved into their proper position and rigidly held there until it is time to be moved forward by the subsequent action of the tying mechanism. Two of the teeth of the pinion 131 are extended out so as to engage with the blank or untoothed portion 167 of the gear wheel 164, and thereby prevent the rotation of said pinion except when its teeth are being engaged by the teeth of said wheel. The tooth 163' on the wheel 163 is so arranged relative to the teeth upon the wheel 164 that as soon as the tooth has moved the holding disks forward and thereby clamped the wire against the holding bar 148 and also cut it off between the holder disks and the twister disks, the teeth of the gear of the wheel 164 will engage with the pinion 138 and thereby actuate the twister head.

The bar 152 is reciprocated for actuating the grippers by means of a rock-shaft 170, which has two forks 171 for engaging with each of the rods 152 between the collars 153, and also with an arm 172, which is preferably provided with a roller 173 and is adapted to fit within a cam-like groove 174, formed upon one side of the wheel 164.

The needles are actuated by the pitman 117, which is connected with a crank 175, formed upon one side of a pinion 176. The pinion is mounted upon a stub-axle 177, at the lower end of an arm or bracket 178, which extends down from the bracket 125 in position for holding said pinion in engagement with a gear wheel 179, which is also secured upon the shaft 165. The wheel 179 is provided with two sets of teeth or cogs 180 and 181, each of which is adapted to give the pinion just half a revolution, whereby the needles are moved forward and held stationary during the process of clamping and cutting the wires, as before described, after which the needle is withdrawn to its original position.

The shaft 165 is rotated by means of clutch mechanism connected with one end thereof and with the adjacent end of another shaft 182, which is provided with a sprocket wheel 183 and adapted to be driven from the sprocket wheel 184 on the shaft 46 by a sprocket chain 185. The end of the shaft 182 is preferably provided with a socket 186, within which the end of the shaft 165 is seated and a disk 187 is rigidly secured to said socket portion. A plate 188 is pivotally secured eccentrically to the face of the disk 187 and is provided with two lateral projections 189 and 190, and is adapted to be held in its operative position by means of a spring 191. One of the projections is adapted to be engaged by projections 192 upon the ends of a cross-head 193, which is secured to the shaft 165, adjacent to the disk 187.

A lever 194 is pivotally mounted at the side of the feeding chamber and has one end provided with a lock or projection 195, which is adapted to be passed through a perforation 196 in the side of said chamber to the rear of the plunger 8 and hold it in that position during a portion of the operation of completing and tying the bale. The forward end of said lock is preferably inclined and the side of the plunger is provided with an inclined groove or channel 197, which is nine inches from the rear end thereof and extends to within four inches of the face of the plunger. Said end of the lever 194 is also provided with an oppositely-extending horn or projection 198, which is adapted to be moved into and out of the path of the projection 190 on the plate 188 and thereby cause it to be swung upon its pivot so as to move the other projection 189 into and out of the path of the projection 192 on the cross-head 193 for the purpose of throwing the twister operating mechanism into or out of gear. The lever is adapted to be moved forward into its locking position, that is, to engage with the plungers, by means of a spring 199, and it is adapted to be moved into its other or inoperative position by means of an inclined projection 200 on the face of the disk 187. The lever is adapted to be locked or held in its inoperative position, by means of a shoulder 201 upon the free end of a spring arm 202, which is secured to the underside of the feeding chamber and projects therefrom. The shoulder 201 is preferably formed by means of a spring, which has its free end passed through the spring 202, whereby the lever will be held against forward movement when the spring lies adjacent to its lower end, but it can be forced back into its normal position by bending the shoulder out of the way. The spring 202 is drawn away from the side of the lower end of the lever 194 by a rod 203, which is provided with a shoulder, as by bending or doubling it upon itself with its free end 204 in engagement with the side of the spring. The lower end of the lever 194 is provided with an inclined pin or projection 205, which is adapted to engage with the rod 203 and raise the same so as to lift its free end 204 out of engagement with the spring and thereby let the spring return to its normal position adjacent to the side of the lever, while said lever 194 still stands in its locking or operative position. The upper edge of the spring is preferably provided with extensions 206, between which the rod 203 is seated and which will permit of the vertical movement of the rod by the inclined pin 205, as will be understood.

As above described, it will be seen that after a bale has been completed and it is necessary to actuate the tying mechanism, the rod 203 will be moved longitudinally, so as to withdraw the spring 202 from engagement with the lever, which will permit the spring 199 to move the lock 195 into engagement with the plunger and also to remove the horn 198 from above the projection 190. As soon as this occurs, the spring 191 will swing the plate 188 so as to move the projection 189 outwardly into the path of the projections 192 on the cross-head 193, said movement being limited by causing the opposite end of the plate 188 to engage with the socket portion 186. As soon as the tying operation has been completed, which is done by one complete rotation of the shafts 165 and the disk 187, the inclined projection 200 will engage with a shoulder or projection 208 on the upper portion of the lever 194 and move it back into its normal position, whereby the forward end of the lock will be withdrawn from engagement with the plunger and the rear end or horn will engage with the projection 190 and swing the plate 188 so as to move the projection 189 out of the path of the projections on the cross-head 193 and thereby stop the operation of the tying mechanism. While the lock 195 remains behind the plunger, suitable means are provided for permitting the constant forward movement of the driving mechanism without moving the plunger to the rear.

The rod 203 is actuated or moved longitudinally by means of suitable mechanism which is adapted to be actuated by the rearward movement of the bale as it is being formed by the plunger. In the drawings, a toothed wheel 209 is shown mounted upon a shaft 210 in the forward end of an arm 211, said arm being pivotally mounted at the other end by means of a standard 212 and a sleeve 213. The wheel 209 is adapted to be adjusted so as to vary its periphery or circumference, whereby the length of the bale may be varied to suit conditions or circumstances. This adjustment is preferably secured by arranging a series of substantially triangular plates 214 upon a disk 215 and moving the plates radially by means of a plurality of levers 216, which are pivotally mounted between ears 217 on a suitable block or head 218, that is secured to the shaft 210. The plates 214 are each provided with a slot 219, through which an elongated projection 220 on the disk 215 projects, and its outer edge is provided with teeth 221. An annular plate or disk 222 is secured to the projection 220, so as to hold the plates in position and only permit them to be moved back and forth radially. The inner end of each plate is provided with two laterally-extending flanges 223, between which the inner ends of the levers 216 extend, and by means of which the plates are moved back and forth as said levers are swung upon their pivots. The outer ends of the levers project through inclined openings 224 in a collar 225, that is loosely mounted upon the outer end of the shaft 210 and is normally pressed forward or outward by means of a spring 226, which is seated in a cavity 227 in the block 218 for the reception of the inner end of said collar 225. The outer end of the shaft 210 is screw-threaded and a hand-wheel 228 is mounted thereon for the purpose of forcing said collar 225 inward so as to cause the outer ends of the levers to move toward the shaft and their opposite ends to move outward toward the edge of the disk 25 and thereby carry the plates 214 outward, and thus increase the diameter of the measuring wheel. The other end of the shaft 210 is provided with a pinion 229, which is adapted to engage with a gear wheel 230 that is mounted on a stub axle at the end of a bracket 231, which projects forward from the end of the arm 211, said arm being bifurcated at its forward end and provided with a sleeve 232, within which the shaft 210 is journaled.

The gear wheel 230, which is preferably twice the diameter of the pinion 229 is provided with a cam or projection 233, which is adapted to engage with the upper end of a lever 234, and thereby actuate the rod 203, which is secured to the lower end of the lever.

In operating the baling press, as above described, the ends of the wires are passed through one side of the head and the free end of each placed in the recesses of the holding disk and secured therein by giving said disk a partial revolution. A stop, as a piece of plank of the same size as the cross-section of the bale, is placed in the forward end of the baling chamber directly in front of the wires to afford the pressure surface for the forward end of the first bale. The machine is then started and material fed thereto in any desired manner, the hood being used in connection with a threshing machine, but being removed for hand feeding, and if desired, in hand feeding, feeding belts may be arranged to carry the material from any desired point to the feeders of the baling press, said feeding belts being operated in any desired manner, either from the power that drives the baler, or from an independent power. The material is then fed into the hopper by the two feeders, and from there carried into the feeding chamber by the foot press, said press being withdrawn just previous to the forward movement of the plunger which carries the material ahead of it against the wires and into the baling chamber. Where the rake is used for stopping the material during the actuation of the press foot and the plunger, it is caused to descend just before the press foot mechanism, its descent thereby separating the material within the feeders from that within the hopper, so as to prevent as much as possible the material extending from the feeding chamber up into the hopper when the plunger moves forward.

As soon as the bale has reached the desired length, as determined by the measuring wheel, which is preferably caused to rotate twice, it causes the cam to actuate the lever and thereby draw the spring back from behind the trip mechanism that controls the tying machinery and sets it in motion. The first result of said movement is the actuation of the needles which carry each wire across to the rear of the bale and deposit it in the recesses of the twister disks, where it is immediately grasped by the reciprocation of the gripper-actuating rod. The holder disks are then driven a step forward by the single toothed gear wheel which cuts the wire around the bale from that leading from the spool and also secures the spool end of the wire between the holding disks. The twister disks are then rotated which secures the two ends of each wire together, after which the gripper rod is withdrawn and the wires released, so that they can be drawn out of the twisting disks by the forward movement of the bale, which is caused by the subsequent formaion of a new bale. During the process of twisting the wires together, the needles are withdrawn, which will leave one end of each wire fast in its respective holding disk and the desired number of strands of wire, preferably two, are drawn across the baling chamber in position for receiving the material from the successive movements of the plunger. Upon the completion of the tying operation, the clutch mechanism has been automatically thrown out of engagement and the twister mechanism is stopped and remains stationary until put in operation by the completion of another bale.

If at any time the supply of material to the hopper becomes excessive, its pressure against the regulating plate therein automatically causes the clutch mechanism which controls the action of the feeders to be thrown out of gear and the feeders will be stopped until the material in the hopper has been carried down into the feeding chamber, after which the clutch mechanism will be automatically thrown into gear and the feeders will discharge the material into the hopper as before. The amount of pressure to be given to each bale is regulated or adjusted by means of the mechanism at the rear or discharge end of the slatted or baling chamber. As the measuring wheel is located at a distance from the front of the baling chamber and cannot be actuated until after a bale or a portion thereof has been formed, it is necessary to throw the twisting mechanism into gear by hand for the first bale, after which the wheel can be adjusted so as to automatically actuate said twisting mechanism. For this purpose, the wheel is adapted to be moved vertically by swinging the arm forward, which will permit of the wheel being rotated so as to place the cam in proper relation to the lever for acting automatically at the completion of the succeeding bales. To insure that the wheel will engage with the bales with sufficient pressure to cause its rotation, a spring 235 is preferably arranged so as to normally hold the wheel downward into engagement with the bale.

Although I have shown and described what I consider the most desirable form for constructing my improved baling press, it is evident that changes and alterations can be made therein, and I reserve the right to make all such variations as will come within the spirit of the invention as disclosed in the appended claims.

Having thus described my invention, what I claim as new, and desire to secure by Letters-Patent, is,—

1. In a baling press, a feeding chamber, a baling chamber, the sides of which are perforated, brackets adjacent to the perforations on one side of the press, and tying mechanism adjacent to the openings on the other side of the press, a bar mounted in each bracket, the forward end of which is provided with a head adapted to engage with a wire and place the same in the binding mechanism, a rock-shaft provided with a crank at one end and two arms, links for connecting the front ends of said arms with said needles, a pitman connected with said crank, and means for actuating the tying mechanism and said pitman.

2. In a baling press, a feeding chamber, a baling chamber, reciprocatory needles arranged to be moved across said press, each needle having a forked head and each arm of said fork being provided with an anti-friction pulley, one of said arms being provided with a finger and the other arm with a stop in front of its pulley, tying mechanism upon the side of the press in position to be between the arms of said fork and to engage the wire carried thereby, and means for actuating said tying mechanism and said needles.

3. In a baling press, a feeding chamber, a baling chamber, tying mechanism upon one side of the press comprising a holding member and a twisting member, each of said members comprising two duplicate members at a distance from each other, means between the holding members for engaging with a wire, means between the twisting members for gripping both ends of said wire, means between the holders and twisters for severing said wire, means for actuating said members, and means for placing a wire in engagement with said members.

4. In a baling press, a feeding chamber, a baling chamber, tying mechanism upon one side of the press, said mechanism comprising two nested sleeves, one of which is provided at one end with a holding member and the other with a twisting member, means at the other ends of said sleeves for rotating them, a holder adapted to coact with said holding members, gripping mechanism adapted to coact with the twisting members, means between said members for cutting a wire, means for placing a wire in said members, and means for engaging with the actuating mechanism on each of said sleeves.

5. In a baling press, a feeding chamber, a baling chamber, tying mechanism upon one side of the press comprising two nested sleeves, one of which is shouldered, a twisting member on said shouldered sleeve, a holding member on the other sleeve, means at the other ends of said sleeves for actuating the same, gripping mechanism mounted upon the twisting member, a rod reciprocally mounted in the inner sleeve adapted to actuate the grippers, means for placing a wire in said tying mechanism, means for actuating said holding and twisting members, and means for reciprocating said rod.

6. In a baling press, a feeding chamber, a baling chamber, tying mechanism at one side of the press comprising two nested sleeves, two notched disks secured upon the end of each of said sleeves, means at the other ends of said sleeves for rotating them, means for coacting with two of said disks for holding a wire, substantially L-shaped grippers pivotally secured between the other disks, a rod reciprocally mounted in the inner sleeve having its inner end provided with inclined walls for actuating said grippers, means for placing a wire in said tying mechanism, and means for reciprocating said rod.

7. In a baling press, a feeding chamber, a baling chamber, tying mechanism at one side of the press comprising two nested sleeves, two sets of disks upon one end of each of said sleeves, the disks of one set being provided with two notches in their peripheries and the disks of the other set being provided with a plurality of notches, means at the other ends of said sleeves for moving the multi-notched disks one step at a time, and the other disks a plurality of rotations, a holder between the multi-notched disks, grippers between the other disks, and a cutter between said sets of disks.

8. In a baling press, a feeding chamber, a baling chamber, tying mechanism at one side of the press comprising two sets of notched disks at a distance from each other, grippers between one set of disks, a holder adjustably mounted between the other sets of disks, a cutter between said sets, and means for moving one of said sets of disks forward one step at a time, and means for rotating the other set of disks a plurality of times.

9. In a baling press, a feeding chamber, a baling chamber, tying mechanism at one side of the press comprising two sets of rotary notched disks, grippers between one set of said disks, a cutter between the sets of disks, pins adjacent to the disks of the other set, a holder mounted thereon with its free end between the disks of said other set, a shouldered screw for engaging with said holder and adjusting the same, means for rotating one set of said disks one step at a time, and means for rotating the other set a plurality of times.

10. In a baling press, a feeding chamber, a baling chamber, tying mechanism at one side of the press comprising two nested sleeves, holding and twisting mechanism at one end of said sleeves, means at the other end of the sleeves for rotating them, means independently of said rotating means for permitting a limited rotary movement of said sleeves relative to each other.

11. In a baling press, a feeding chamber, a baling chamber, tying mechanism at one side of the press comprising two nested sleeves, a holding member at one end of one of the sleeves and a twisting member on the end of the other sleeve, means at the other ends of said sleeves for rotating them, and yielding means for permitting the twisting member to remain stationary temporarily.

12. In a baling press, a feeding chamber, a baling chamber, tying mechanism at one side of the press comprising two nested sleeves, a holding member at one end of one of the sleeves and twisting mechanism at the end of the other sleeve, means at the other ends of said sleeves for actuating them, the means for the twister sleeve comprising a shouldered sleeve, a pinion and an interiorly-recessed annular washer surrounding the shouldered sleeve, a spring in said recess between said shoulder and the wall of the recess, and means for actuating said rotating mechanism.

13. In a baling press, a feeding chamber, a baling chamber, duplicate sets of tying mechanism at one side of the press, each set comprising a holding member and a twisting member, means for rotating said members in unison, and means for actuating one set of said mechanism.

14. In a baling press, a feeding chamber, a baling chamber, two sets of tying mechanism upon one side of the press, each of which is provided with two sprocket wheels, sprocket chains for connecting said wheels, pinions for one of the sets, means for moving one of said pinions forward step by step, and means for rotating the other pinion.

15. In a baling press, a feeding chamber, a baling chamber, two sets of tying mechanisms upon one side of the press, each set being provided with a holding member and a twisting member, means for actuating said members in unison, pinions for one set of said members, gear wheels for engaging with said pinions, one of said wheels being provided with one tooth, whereby the holding member is moved forward one step at a time and the other gear wheel being provided with a plurality of teeth for rotating the twister heads during a portion of the revolution of said gear wheel.

16. In baling press, a feeding chamber, a baling chamber, two sets of tying mechanisms on one side of the press, each set being provided with a holding member and a twisting member, grippers for the twisting member, means for actuating said sets in unison, a reciprocatory rod for actuating the grippers of each set, the outer end of which is provided with collars, a rock-shaft provided with an arm for engaging with said collars, an arm from the rock-shaft for actuating the same, pinions for one set of said mechanisms, gear wheels for engaging with said pinions, and a cam groove upon the side of one of said gear wheels for the reception of the end of the arm from said rock-shaft.

17. In a baling press, a feeding chamber, a baling chamber, duplicate sets of tying mechanism upon one side of the press, each set comprising two nested sleeves, a holding member at one end of one of the sleeves and a twisting member at the end of the other sleeve, a sprocket wheel upon the other end of each of said sleeves, sprocket chains upon the sprocket wheels of the two sets, a pinion at one end of the twister sleeve and a pinion and a scalloped disk at the end of the holder sleeve, two gear wheels for engaging with said pinions and rotating the same, and a disk for engaging with said scalloped disk and holding the same against rotation, said holding disk being provided with a recess in its periphery for permitting the rotation of the scalloped disk when its pinion is being actuated by its gear wheel.

18. In a baling press, a feeding chamber, a baling chamber, two sets of tying mechanism upon one side of the press, each comprising two nested sleeves, a holder at one end of one of the sleeves and a twister at the end of the other sleeve, a sprocket wheel at the other end of each of said sleeves, a pinion at one end of the sleeves of one set, a shouldered sleeve between the end of one of the sleeves and said pinion and sprocket wheel thereon, an interiorly-recessed collar between said pinion and said sprocket wheel, a spring in said recess in engagement with said shoulder, said pinion, sprocket wheel and disk being rigidly secured together and loosely mounted upon said collar, and gear wheels for engaging with said pinions.

19. In a baling press, a feeding chamber, a baling chamber, a bracket on one side of the press, two sets of tying mechanism supported thereby, an arm from said bracket provided with a stub axle, a pinion mounted on said axle and provided with a crank, means for indefinitely actuating said tying mechanism, said means intermittently rotating said pinion, and needle mechanism upon the opposite sides of the press adapted to be actuated by said crank.

20. In a baling press, a reciprocatory plunger, tying mechanism upon one side of the press, two shafts for actuating the same, one end of one of which is provided with a disk and the adjacent end of the other is provided with a cross-head, projections on the cross-head, a plate pivoted eccentrically upon the disk, and provided with projections, one of which is adapted to be moved into and out of the path of the projections on the cross-head, a lever provided with a lock and a horn at one end, the lock being adapted to engage with the plunger and the horn being adapted to engage with the other projection on said plate, and means for actuating said lever at the completion of a bale.

21. In a baling press, a reciprocatory plunger provided with a longitudinal groove upon one side, tying mechanism, two shafts for actuating the same, a disk upon one end of one of said shafts, provided with an inclined shoulder, and a cross-head upon the other, said cross-head being provided with projections, a spring-pressed plate eccentrically pivoted to the disk and provided with two projections, one of which is adapted to be moved into and out of the path of the projections on the cross-head, a lever pivotally mounted upon the side of the press having one end provided with an inclined lock which is adapted to engage with the grooved portion of the plunger, a horn on said end of the lever, adapted to engage with the other projection on the disk, a shoulder on said lever adapted to be engaged by the inclined shoulder on the disk for returning the lever to its normal position, a lock for the other end of the lever, and means for actuating said lock to release said lever.

22. In a baling press, a reciprocatory plunger, tying mechanism upon one side of the press, shafts for actuating the tying mechanism and provided with clutch mechanism, said clutch mechanism including a spring-pressed lever, one end of which is provided with means for engaging with the plunger and for actuating the clutch mechanism and the other end is provided with an inclined projection, a shouldered spring in normal engagement with the last-mentioned end of said lever, and a reciprocating rod for moving said spring and shoulder out of engagement with said lever, said rod being adapted to be engaged by said projection for disengaging it from the spring and permitting the spring to return to its normal position.

23. In a baling press, tying mechanism upon one side of the press, means for actuating the tying mechanism provided with clutch mechanism, said clutch mechanism being adapted to be operated by a spring-pressed lever, the lower end of which is provided with an inclined projection, a spring adjacent thereto, the free end of which is provided with projections, a shouldered spring secured to the free end of the first-mentioned spring with its shoulder in position for holding the lever in its retracted position, a rod between the projections on said spring having its end folded back and adapted to engage the spring and move it away from said lever, the projection on said lever being adapted to lift said lever out of engagement with said spring, whereby it may return into position for holding said lever in its retracted position, and means for reciprocating said rod at the completion of a bale.

24. In a baling press, tying mechanism, means for intermittently actuating the same, a measuring wheel for controlling said means, said wheel comprising a disk, one side of which is provided with elongated projections, slotted triangular plates mounted upon said lugs, the outer edge of each of which projects beyond the edge of the disk and is toothed, an annular plate secured to said projections, and means for moving said plates radially.

25. In a baling press, tying mechanism, means for intermittently actuating the same, a measuring device for controlling said means, said device comprising a disk, a series of radially-movable plates thereon, the inner end of each plate being provided with flanges, pivoted levers, the inner ends of which engage with said projections, a slotted disk for engaging with the outer ends of said levers, and means for moving said disk longitudinally of said levers.

26. In a baling press, tying mechanism, means for intermittently actuating the same, a measuring device for controlling said means, said means comprising a support, a shaft journaled therein having a disk at one end and a pinion at the other, radially-movable members on the disk, a block upon the shaft provided with a recess and perforated ears, levers pivotally mounted between said ears having their inner ends in engagement with said members, a slotted disk for engaging with the outer ends of said levers, a spring within said recess and in engagement with one side of the disk, a hand-wheel upon the shaft in engagement with the other side of the disk, a gear wheel in engagement with said pinion, and provided with a shoulder for actuating said controlling means.

27. In a baling press, tying mechanism, means for intermittently operating the same, an arm pivotally connected at one end with the press and having its free end provided with a bar and projections therefrom, a shaft journaled in said bar having a pinion at one end and a variable measuring wheel and means for actuating the same at the other, a gear wheel mounted upon said projection and provided with a shoulder, a lever adapted to be engaged by said shoulder, and a rod connected with said lever for actuating said controlling means.

28. In a baling press, tying mechanism, means for intermittently actuating the same, an arm pivotally secured to the press at one end, a variable measuring wheel journaled at the free end of said arm having its periphery toothed, a spring for normally holding said wheel in engagement with a completed bale, and means actuated by said wheel for controlling said mechanism.

29. In a baling press, a feeding chamber, a baling chamber, a reciprocatory plunger, spring-pressed dogs for engaging with the material in the baling chamber after each reciprocation, and a reciprocatory holding plate through one of said dogs.

30. In a baling press, a feeding chamber, a baling chamber, a reciprocatory plunger, spring-pressed catches for engaging with the material in the baling chamber after each reciprocation, one of which is slotted longitudinally, a plate reciprocally mounted in said slot, the upper edge of which is perforated, forked arms for engaging with said plate, and means for actuating the arms to reciprocate the plate.

31. In a baling press, a feeding chamber, a baling chamber, a reciprocatory plunger, pivoted catches for engaging with the material in the baling press after each reciprocation, one of which is located at the top and is slotted longitudinally, perforated plates on the side of the press, bolts through the edges of the catch on top and through said perforated plates, a spring on each bolt for engaging said plate and holding said catch in its operative position, a folder extending through said slot, and means for reciprocating said folder.

32. In a baling press, a feeding chamber, a baling chamber, a reciprocatory plunger, catches for engaging with the material in the baling chamber after each reciprocation, a folder plate reciprocally mounted in one of the catches, a rock-shaft provided with arms for engaging with the folder, an arm from the rock-shaft with a projection, a standard secured to the rear end of the plunger, a bar pivotally secured to said standard provided with shoulders adjacent to its free end for engaging with said projection, a support secured to the side of the hopper, and a member secured to said rod for engaging with said support and having its ends shouldered.

33. In a baling press, a feeding chamber, a baling chamber, a hopper above the feeding chamber, automatic feeders at one side of the hopper, means for throwing the same into and out of gear, a plate at the opposite side of the hopper, a shouldered rod pivotally secured to said plate and projecting through the wall of the hopper, a nut upon the side of the hopper around said rod, a screw-threaded sleeve in said nut, a spring between said slot and said shoulder, a lever pivotally secured to the hopper and having one end in engagement with said bolt, and a rod pivotally connected with the other end of said lever for controlling said means.

34. In a baling press, a feeding chamber, a baling chamber, a hopper above the feeding chamber, automatic feeders at one side of the hopper, a yielding member in the hopper opposite the feeders, means for actuating said feeders in unison, means connected with one of said feeders comprising a shaft, a disk thereon, a spring-pressed plate pivotally mounted upon said disk and provided with two projections, a drive shaft provided with a cross-head, projections upon the cross-head, a lever pivotally mounted with one end in position for engaging with one projection on said plate and moving the other projection out of the path of the projections on the cross-head, and means for actuating said lever from said yielding member.

35. In a baling press, a feeding chamber, a baling chamber, a hopper above the feeding chamber, substantially-parallel endless feeders pivotally mounted at one side of the hopper, the lower feeder being longer than the upper one, springs for holding the free ends of said feeders in their normal positions, and means for actuating said feeders in unison.

36. In a baling press, a feeding chamber, a baling chamber, a hopper above the feeding chamber, automatic feeders at one side of the hopper, one above the other, the lower feeder being longer than the upper feeder, and a hood removably mounted upon the extended portion of the lower feeder.

37. In a baling press, a feeding chamber, a baling chamber, a hopper above the feeding chamber, a reciprocatory plunger, a reciprocatory foot-press in the hopper, yielding means for actuating the foot-press, and means for positively moving the foot-press upward in addition to said yielding means.

38. In a baling press, a feeding chamber, a baling chamber, a hopper over the feeding chamber, a plunger, an arm pivotally secured to the side of the press at one end, means for intermittently engaging with the other end of the arm and moving it, a foot press, an arm for reciprocating the foot press, a spring for returning said arm to its normal position, and a rod between said arms, the upper end of which is provided with a spring and the lower end with a shoulder in position for being engaged by the pitman of the plunger.

39. In a baling press, a feeding chamber, a baling chamber, a hopper above the feeding chamber, a standard on one end of the press, an arm and a rod pivotally secured at one end to said standard, one above the other, a spring from the top of the standard to said arm at a distance from its pivotal point, a foot-press pivotally secured to the free end of said arm and rod, and yielding means for drawing said arm and foot-press downward.

40. In a baling press, a feeding chamber, a baling chamber, a hopper above the feeding chamber, automatic feeders at one side of the hopper, cross bars at the top of the hopper above said feeders, and a reciprocatory foot-press adapted to pass down between said bars and force the material from the hopper into the feeding chamber.

41. In a baling press, a feeding chamber, a baling chamber, a hopper above the feeding chamber, tying mechanism at one side of the press, means for actuating the same, a shaft provided with clutch mechanism and a sprocket wheel, automatic feeders at one side of the hopper, means for actuating the same provided with clutch mechanism, a driving shaft provided with a sprocket wheel and connected with said second-mentioned clutch mechanism, a sprocket chain on said sprocket wheels, and means for actuating said driving shaft.

In testimony whereof I have hereunto set my hand in presence of two subscribing witnesses.

CHARLES CLARK.

Witnesses:
T. J. Doss,
W. L. Doss.